US012286950B2

(12) United States Patent
Gunji et al.

(10) Patent No.: US 12,286,950 B2
(45) Date of Patent: Apr. 29, 2025

(54) WORKING METHOD OF ORIFICE AND FUEL INJECTION VALVE

(71) Applicant: Hitachi Astemo, Ltd., Hitachinaka (JP)

(72) Inventors: Kenichi Gunji, Hitachinaka (JP); Masato Higuma, Hitachinaka (JP); Ryohei Matsutake, Hitachinaka (JP); Yuta Yanagisawa, Hitachinaka (JP); Yuki Sugiyama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 540 days.

(21) Appl. No.: 17/596,469

(22) PCT Filed: Mar. 27, 2020

(86) PCT No.: PCT/JP2020/013949

§ 371 (c)(1),
(2) Date: Dec. 10, 2021

(87) PCT Pub. No.: WO2020/250542

PCT Pub. Date: Dec. 17, 2020

(65) Prior Publication Data

US 2022/0275779 A1 Sep. 1, 2022

(30) Foreign Application Priority Data

Jun. 11, 2019 (JP) ................................ 2019-108469

(51) Int. Cl.
*F02M 61/18* (2006.01)

(52) U.S. Cl.
CPC ...... *F02M 61/1853* (2013.01); *F02M 61/188* (2013.01); *F02M 2200/06* (2013.01)

(58) Field of Classification Search
CPC ............. F02M 61/1853; F02M 61/188; F02M 2200/06; F02M 61/1806; F02M 61/1833;
(Continued)

(56) References Cited

U.S. PATENT DOCUMENTS

2006/0226263 A1* 10/2006 Holzgrefe .......... F02M 61/1846 239/533.2
2011/0011954 A1* 1/2011 Gunji ................. F02M 61/1846 239/533.3
2016/0319792 A1 11/2016 Agresta et al.

FOREIGN PATENT DOCUMENTS

JP H0868371 * 8/1994 ............. B21D 28/24
JP 8-68371 A 3/1996
(Continued)

OTHER PUBLICATIONS

International Search Report (PCT/ISA/210) issued in PCT Application No. PCT/JP2020/013949 dated Aug. 4, 2020 with English translation (six (6) pages).
(Continued)

*Primary Examiner* — Christopher R Dandridge
(74) *Attorney, Agent, or Firm* — Crowell & Moring LLP

(57) ABSTRACT

An object of the present invention is to provide a working method of an orifice, which has excellent working accuracy and high productivity in order to work an inclination portion (tapered portion) on the entire circumference of an inner wall of an orifice. Therefore, a working method of an orifice includes a first step of forming an orifice hole 54*d* in an orifice forming member, a second step of pressing a downstream end surface of the orifice forming member in which the orifice hole 54*d* opens, in a direction toward an upstream side of the orifice hole 54*d* by a punch 46 having a cutting blade portion 46*a* larger than a cross section of the orifice hole 54*d*. The second step causes a material of the orifice forming member to flow from an entire circumference at the downstream end portion of the orifice hole 54*d* to an inside of the orifice hole 54*d* to form a cross-sectional area reduction portion 54*s* in which a cross-sectional area of the orifice hole 54*d* is reduced from an upstream side to a downstream side.

10 Claims, 11 Drawing Sheets

(58) Field of Classification Search
CPC .. F02M 61/1846; F02M 61/1826; B05B 1/14; B05B 1/005; B05B 1/02; B05B 1/042; B05B 1/00; B05B 17/0638
See application file for complete search history.

(56) References Cited

FOREIGN PATENT DOCUMENTS

| | | | |
|---|---|---|---|
| JP | 2001-173804 | A | 6/2001 |
| JP | 2007-51573 | A | 3/2007 |
| JP | 2008-101499 | A | 5/2008 |

OTHER PUBLICATIONS

Japanese-language Written Opinion (PCT/ISA/237) issued in PCT Application No. PCT/JP2020/013949 dated Aug. 4, 2020 (four (4) pages).

* cited by examiner

WORKING METHOD OF ORIFICE AND FUEL INJECTION VALVE

TECHNICAL FIELD

The present invention relates to a fluid injection valve that injects a fluid, and particularly relates to a shape of an injection portion suitable for a fuel injection valve of a cylinder injection type internal combustion engine and a working method of the injection portion.

BACKGROUND ART

As exhaust gas regulations and fuel consumption regulations for automobiles are strengthened, further reduction of particulate matter (PM) in an exhaust gas and particulate number (PN) of exhaust fine particles becomes an object.

In the fuel injection valve of a cylinder injection type internal combustion engine, a tip end portion as a fuel injection portion is mounted inside a combustion chamber. Thus, soot and the like generated by combustion may be likely to be accumulated, and fuel may remain in the accumulated soot, and thus thick combustion that causes generation of soot may be caused.

There is US 2016/0319792 A (PTL 1) as a document considering reduction of the PM and the PN. An injection portion of a fuel injection valve in PTL 1 includes a first portion formed between an inlet opening of the injection portion and an intermediate portion where a second opening is formed, and a second portion formed between the intermediate portion and an outlet opening of the injection portion (paragraph 0021). PTL 1 discloses that the first portion forms a conical shape with a cut tip end and is formed so that the cross-sectional area decreases from the inlet opening of the injection portion to the intermediate portion (paragraph 0041). A bottom surface of the second portion is formed in the intermediate portion where a second opening is formed, and the bottom surface of the second portion is worked to have a larger diameter than the second opening (FIG. 2). Further, PTL 1 discloses that the second portion forms a conical shape with a cut tip end, and is formed so that the cross-sectional area increases from the intermediate portion (the bottom surface of the second portion) to the inlet opening of the injection portion (paragraph 0045).

In addition, there is JP 2007-51573 A (PTL 2) as a document in which an orifice is formed by press working using a punch. In the working method of an orifice in PTL 2, a downstream end surface of the orifice is coined by a punch having a coining portion, so that an inclination portion inclined toward the center of the orifice is worked in ½ of the inner wall of the orifice in a circumferential direction (paragraphs 0020 to 0021).

CITATION LIST

Patent Literature

PTL 1: US 2016-0319792 A
PTL 2: JP 2007-51573 A

SUMMARY OF INVENTION

Technical Problem

In the injection portion in PTL 1, the first portion of the injection portion is formed in a conical shape tapered toward the downstream side between the inlet opening of the injection portion and the intermediate portion where the second opening is formed. That is, the entirety of the orifice is formed in a conical shape.

Generally, manufacturing of an orifice plate for forming an orifice includes a plurality of working steps, and dimensional errors of an orifice plate material and working errors occurring in the respective working steps are stacked, and it is difficult to manage the axial length of the first portion (orifice) with high accuracy. In this case, since the first portion (orifice) is formed in a conical shape, the diameter of the inlet opening of the injection portion or the diameter of the second opening changes due to variations in the axial length of the first portion (orifice), and there is a possibility that the injection amount varies.

In addition, PTL 1 does not consider a working method of an orifice. On the other hand, PTL 2 discloses a working method of an orifice using press working. However, in PTL 2, for the purpose of increasing the spread of the spray, an inclination portion is worked on a portion of the inner wall of the orifice in the circumferential direction.

An object of the present invention is to provide a working method of an orifice, which has excellent working accuracy and high productivity in order to work an inclination portion (tapered portion) on the entire circumference of an inner wall of an orifice, and a fuel injection valve.

Solution to Problem

In order to achieve the above object, according to the present invention, a working method of an orifice includes a first step of forming an orifice hole in an orifice forming member, a second step of pressing a downstream end surface of the orifice forming member in which the orifice hole opens, in a direction toward an upstream side of the orifice hole by a punch having a cutting blade portion larger than a cross section of the orifice hole. The second step causes a material of the orifice forming member to flow from an entire circumference at a downstream end portion of the orifice hole to an inside of the orifice hole to form a cross-sectional area reduction portion in which a cross-sectional area of the orifice hole is reduced from an upstream side to a downstream side.

In addition, in order to achieve the above object, according to the present invention, a fuel injection valve includes an orifice forming member in which an orifice hole is formed. The orifice forming member includes a cross-sectional area reduction portion having a cross-sectional area that is reduced from a first inner circumferential surface on an upstream side of the orifice hole toward a downstream side, a first recess portion that is formed on a downstream side of the cross-sectional area reduction portion and has an inner diameter larger than the minimum inner diameter of the cross-sectional area reduction portion, and a second recess portion that is formed on a downstream side of the first recess portion and has an inner diameter larger than the inner diameter of the first recess portion.

Advantageous Effects of Invention

According to the present invention, it is possible to provide a working method of an orifice, which has excellent working accuracy and high productivity in order to work an inclination portion (tapered portion) on the entire circumference of an inner wall of an orifice, and a fuel injection valve.

Objects, configurations, and advantageous effects other than those described above will be clarified by the descriptions of the following embodiments.

DESCRIPTION OF EMBODIMENTS

Hereinafter, examples of the present invention will be described in detail with reference to the drawings.

Figure 1:
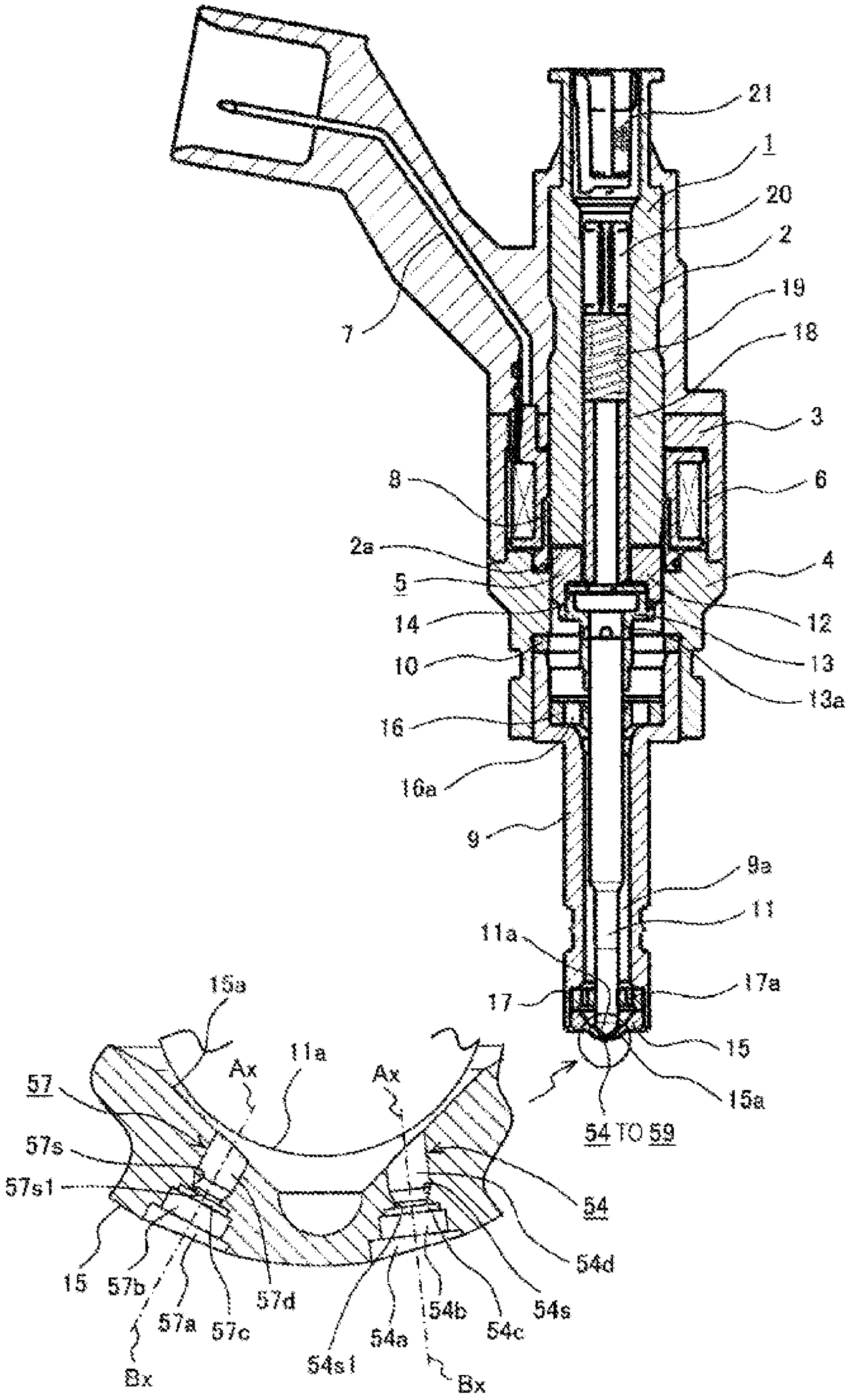
FIG. 1 is a cross-sectional view illustrating a cross section parallel to a center axis of a fuel injection valve according to an example of the present invention.

FIG. 1 is a cross-sectional view illustrating a cross section parallel to a center axis of a fuel injection valve according to an example of the present invention. A fuel injection valve 1 in the present example is a fuel injection valve that injects fuel such as gasoline, and is used to inject fuel to an engine of an automobile.

The fuel injection valve 1 includes a magnetic circuit including a core 2, a yoke 3, a housing 4, and a mover 5, a coil 6 that excites the magnetic circuit, and a terminal 7 that energizes the coil 6. A seal ring 8 is coupled between the core 2 and the housing 4 to prevent a fluid such as fuel from flowing into the coil 6.

A valve component is housed inside the housing 4, and the mover 5, a nozzle holder 9, and a ring 10 for adjusting the stroke amount of the mover 5 are disposed. The mover 5 is formed by coupling a valve body 11 and a movable core 12 by a joint 13, and includes a plate 14 that suppresses a bound when the mover 5 is closed in cooperation with a pipe 18 between the movable core 12 and the joint 13.

The housing 4 and the nozzle holder 9 constituting an outer coat member cover the periphery of the mover 5.

The nozzle holder 9 is provided with an orifice plate (orifice forming member) 15 having a seat surface 15*a* (valve seat) and orifices 54 to 59 at the tip end, and a guide plate B (second guide member) 17 that slidably guides the mover 5 together with a guide plate A (first guide member) 16. The orifice plate 15 and the guide plate B17 may be configured as separate members from the nozzle holder 9, or may be configured by integrating these members.

A spring 19 that presses the valve body 11 against the seat surface 15*a* via the pipe 18 and the plate 14, an adjuster 20 that adjusts a pressing load of the spring 19, and a filter 21 that prevents intrusion of contamination from the outside are disposed Inside the core 2.

Next, an operation of the fuel injection valve 1 will be described in detail.

When the coil 6 is energized, the mover 5 is attracted toward the core 2 against the biasing force of the spring 19, and a gap is formed between the valve seat portion 11*a* at the tip end of the mover 5 and the seat surface 15*a* (valve open state). The pressurized fuel first enters the nozzle holder 9 from the core 2, the adjuster 20, and the pipe 18 through the fuel passage 13*a* in the mover 5. Then, the fuel enters into the passage 17*a* of the guide plate B from the fuel passage 16*a* of the guide plate A16 and the passage 9*a* of the nozzle holder, and is injected from the gap between the valve seat portion 11*a* and the seat surface 15*a* through the orifices 54 to 59.

The orifices 54 to 59 are formed at a different inclination angle in a direction inclined with respect to the center axis 1*a* of the fuel injection valve.

On the other hand, when the current of the coil 6 is cut off, the valve seat portion 11*a* of the mover 5 abuts on the seat surface 15*a* by the force of the spring 19, and the valve is closed.

Next, the configurations of the orifice plate 15 and the orifices 54 to 59 in the fuel injection valve 1 will be described in detail.

Figure 2:
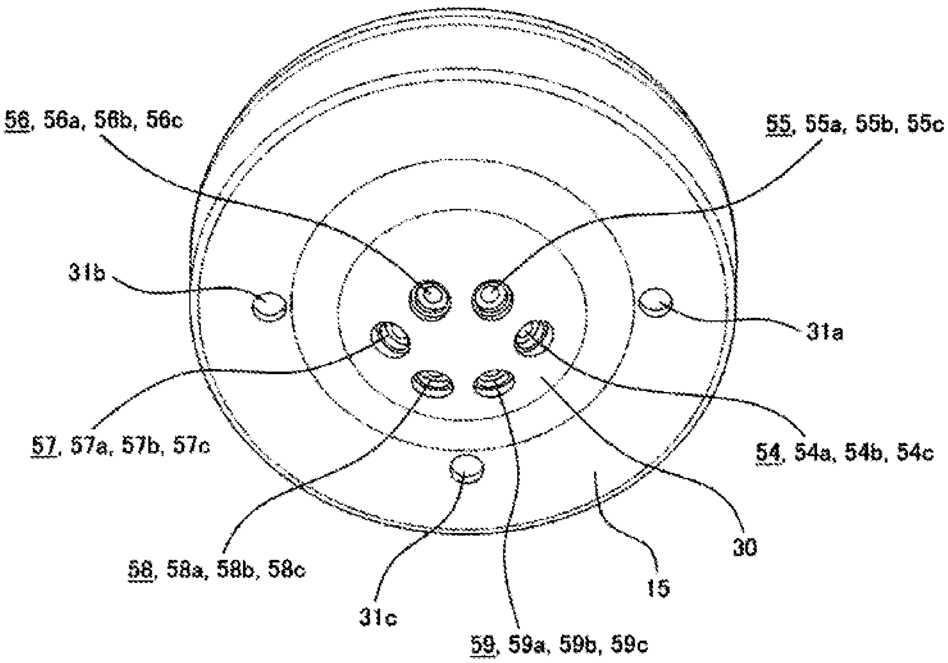
FIG. 2 is a perspective view of an orifice plate according to an example of the present invention.
Figure 3:
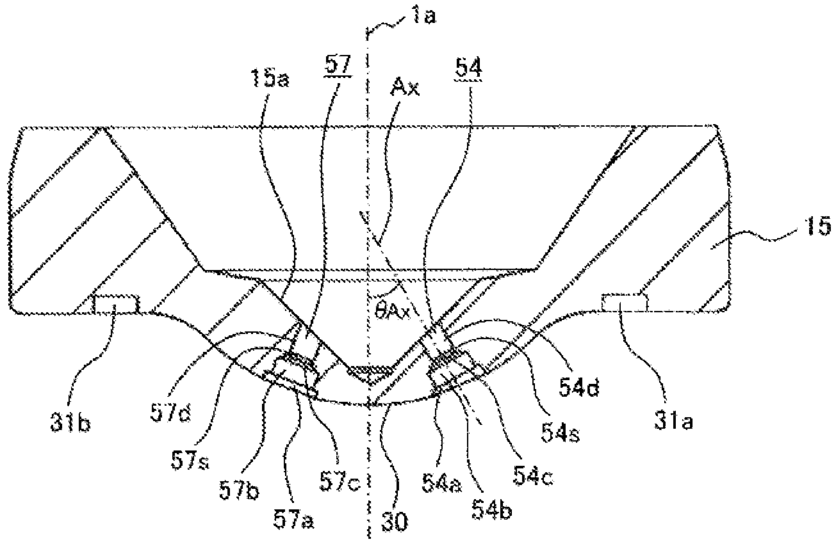
FIG. 3 is a cross-sectional view illustrating a cross section parallel to a center axis of the orifice plate according to the example of the present invention.

FIG. 2 is a perspective view of the orifice plate according to the example of the present invention. FIG. 3 is a cross-sectional view illustrating a cross section parallel to the center axis of the orifice plate according to the example of the present invention.

The orifice plate 15 is made of a substantially disk-shaped metal plate, a spherical portion 30 as a convex curved surface portion is integrally provided at a substantially central portion of one end surface, and a substantially conical seat surface 15*a* constituting a valve seat is provided on the other end surface (opposite end surface) of the spherical portion 30.

In the spherical portion 30, orifices 54, 55, 56, 57, 58, and 59 for injecting fuel are formed in a direction having an angle θAx with respect to the center axis 1*a* of the fuel injection valve 1, in other words, in an inclined direction. The respective orifices 54, 55, 56, 57, 58, and 59 are formed to have different inclination angles θAx, and are arranged in a predetermined direction with respect to the positioning holes 31*a*, 31*b*, and 31*c*.

The cross-sectional shapes of the orifices 54 to 59 are basically the same as each other, and the orifice will be described using the cross-sectional shape of the orifice 54 in FIG. 1 as a representative.

The orifice 54 is inclined with respect to the center axis 1*a* of the fuel injection valve 1, and is opened on a substantially conical seat surface 15*a*. Therefore, the orifice 54 has a curved upstream inlet portion (inlet opening surface), has an orifice cylindrical portion (orifice hole) 54*d* having a cylindrical shape from the inlet portion of the orifice 54 toward the downstream side, becomes a tapered portion 54*s* tapered from the middle toward the outlet opening portion (outlet opening surface) of the orifice 54, and a terminal end of the tapered portion 54*s* has a substantially minimum diameter.

Circular opening portions A (third opening portions) 54*a*, 55*a*, 56*a*, 57*a*, 58*a*, and 59*a* that form steps are provided on the side opening to the spherical portion 30 that is the downstream portion of the orifices 54 to 59. Opening portions B (second opening portions) 54*b*, 59*b*, 56*b*, 57*b*, 58*b*, and 59*b* having a smaller diameter than the opening portions A54*a* to 59*a* and having a circular shape are provided on a side connected to the orifices 54 to 59, which is an upstream side thereof. That is, the opening portions B54*b* to 59*b* are provided at the bottom of the opening portion A. Further, on the upstream side, circular opening portions C (first opening portions) 54*c*, 55*c*, 56*c*, 57*c*, 58*c*, and 59*c* having smaller diameters than the opening portions B54*b* to 59*b* are provided. That is, the opening portions C54*c* to 59*c* are provided at the bottom of the opening portion B. The openings form three steps as a whole by the opening portions A54*a* to 59*a*, the opening portions B 4*b* to 59*b*, and the opening portions C54*c* to 59*c*. The injection portion includes the orifices 54 to 59 and the opening portions 54*a* to 59*a*, 54*b* to 59*b*, and 54*c* to 59*c*.

The opening portions A54*a*, 55*a*, 56*a*, 57*a*, 58*a*, and 59*a*, the opening portions B54*b*, 55*b*, 56*b*, 57*b*, 58*b*, and 59*b*, and the opening portions C54*c*, 55*c*, 56*c*, 57*c*, 58*c*, and 59*c* have a concave hole shape when viewed from the downstream side, and thus may be referred to as a recess portion.

The bottom surfaces of the opening portions A54*a* to 59*a* and the opening portions B54*b* to 59*b* are formed to be surfaces substantially perpendicular to the center axis line Ax of the orifice, and the center axis line Bx of the opening portion A and the opening portion B and the center axis line Ax of the orifice are substantially straight.

Since the length of the orifice is highly sensitive to the length of the spray penetration, for example, in order to optimally set the length of the orifice 54 in consideration of the spray shape and workability, the depth of the opening portion B54*b* can be appropriately changed. The same applies to other orifices. The length of the orifice can be changed by changing the depth of the opening portion B, and the spray shape can be optimized and the workability can be improved. Therefore, at least two of the opening portions B have different depths for each orifice.

With the orifice shape as described above, the fuel rapidly changes the flow direction from the gap between the valve seat portion 11*a* and the seat surface 15*a* and flows into the orifice 54, and becomes a flow biased toward the center axis 1*a* side inner wall of the fuel injection valve 1 in the orifice cylindrical portion 54*d*. However, the fuel is rectified by the orifice cylindrical portion 54*d*, further assembled while changing the direction in the center axis Ax direction of the orifice 54 by the tapered portion 54*s*, pressurized and accelerated, and injected into the engine cylinder through the opening portion C, the opening portion B, and the opening portion A.

As described above, since the fuel changes its direction in the center axis Ax direction of the orifice at the tapered portion and gathers, and is pressurized and accelerated, the fuel does not interfere with the opening portion C, the opening portion B, and the inner walls of the opening portion A, and hardly adheres to the opening portion C, the opening portion B, and the inner walls of the opening portion A, and further the adhesion to the spherical portion 30 can be reduced.

Next, a flow of a working method of the orifice plate 15 will be described with reference to FIGS. 4 to 12.

Figure 4:
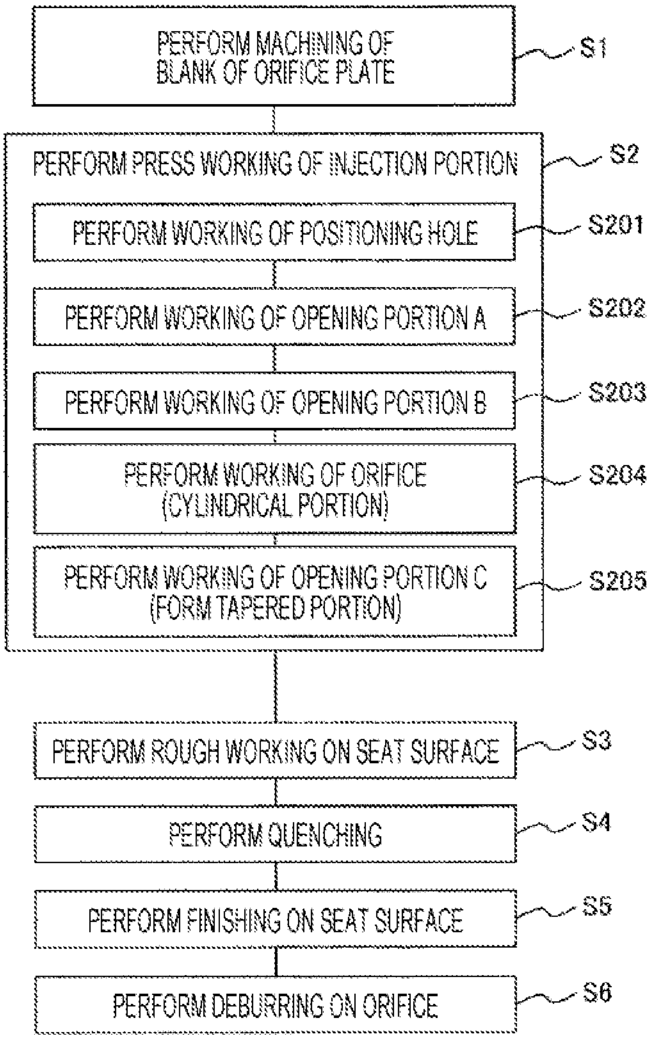
FIG. 4 is a flowchart illustrating a working step of the orifice plate according to the example of the present invention.
Figure 5:
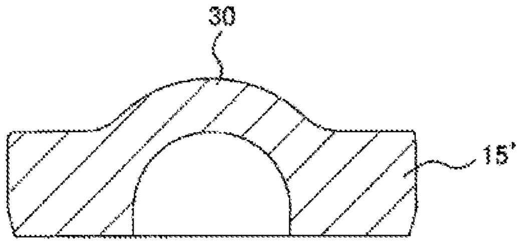
FIG. 5 is a cross-sectional view illustrating a cross section parallel to a center axis of an orifice plate blank according to the example of the present invention.
Figure 6:
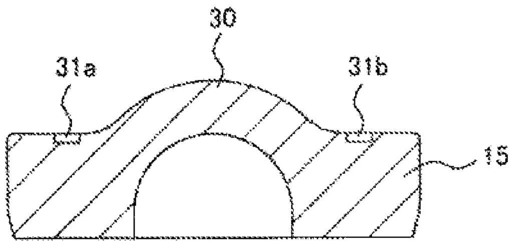
FIG. 6 is a cross-sectional view after a positioning hole is worked in the orifice plate illustrated in FIG. 5.
Figure 7:
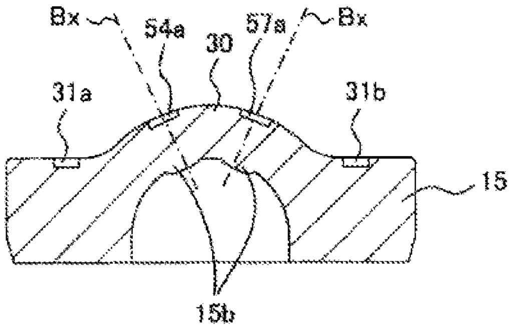
FIG. 7 is a cross-sectional view after an opening portion A is worked in the orifice plate illustrated in FIG. 6.
Figure 8:
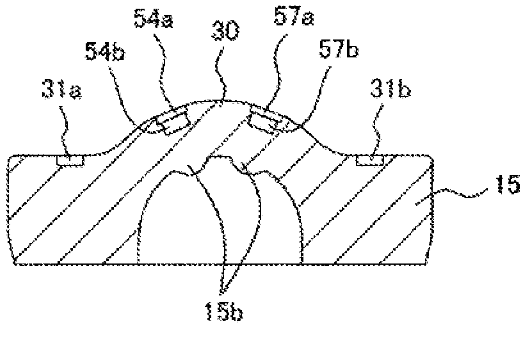
FIG. 8 is a cross-sectional view after an opening portion B is worked in the orifice plate illustrated in FIG. 7.
Figure 9:
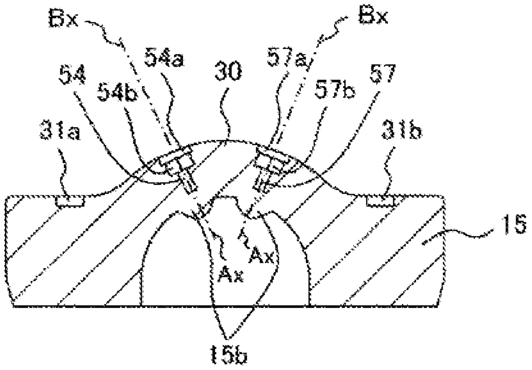
FIG. 9 is a cross-sectional view after an orifice is worked in the orifice plate illustrated in FIG. 8.
Figure 10:
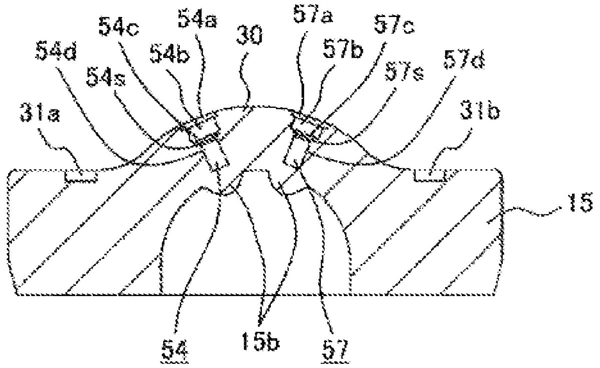
FIG. 10 is a cross-sectional view after an opening portion C and a tapered portion are worked in the orifice plate illustrated in FIG. 9.
Figure 11:
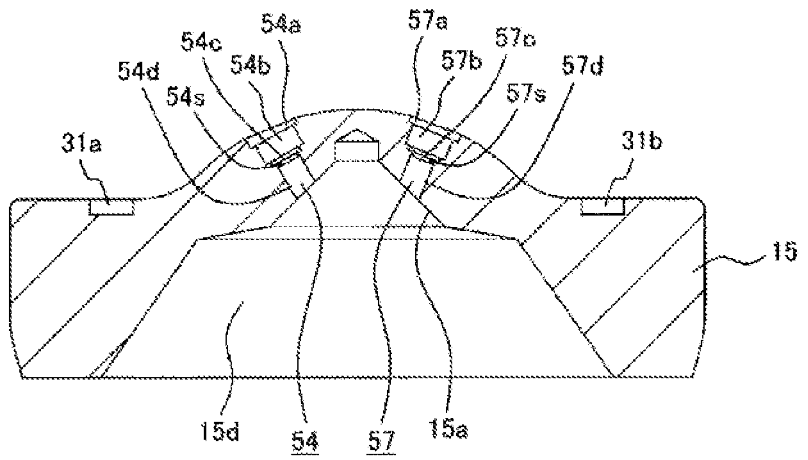
FIG. 11 is a cross-sectional view after a seat surface is rough-worked in the orifice plate illustrated in FIG. 9.
Figure 12:
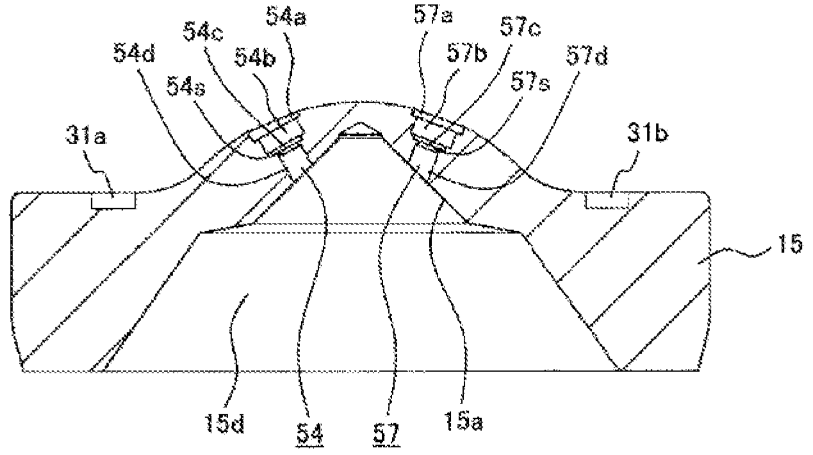
FIG. 12 is a cross-sectional view after the seat surface is finished in the orifice plate illustrated in FIG. 9.

FIG. 4 is a flowchart illustrating a working step of the orifice plate according to the example of the present invention. FIG. 5 is a cross-sectional view illustrating a cross section parallel to the center axis of an orifice plate blank according to the example of the present invention. FIG. 6 is a cross-sectional view after the positioning hole is worked in the orifice plate illustrated in FIG. 5. FIG. 7 is a cross-sectional view after the opening portion A is worked in the orifice plate illustrated in FIG. 6. FIG. 8 is a cross-sectional view after the opening portion B is worked in the orifice plate illustrated in FIG. 7. FIG. 9 is a cross-sectional view after the orifice is worked in the orifice plate illustrated in FIG. 8. FIG. 10 is a cross-sectional view after the opening portion C and the tapered portion are worked in the orifice plate illustrated in FIG. 9. FIG. 11 is a cross-sectional view after the seat surface is rough-worked in the orifice plate illustrated in FIG. 9. FIG. 12 is a cross-sectional view after the seat surface is finished in the orifice plate illustrated in FIG. 9.

In Step S1, a blank 15' of the orifice plate 15 is machined. The blank 15' has a shape as illustrated in FIG. 5.

After Step S1, Step S2 of press working an injection portion is performed. In this press working, first, a working step S201 of the positioning holes 31*a* to 31*c* is performed. The orifice plate 15 having the positioning holes 31*a*, 31*b*, and 31*c* is formed by the working step S201 as illustrated in FIG. 6.

After the working step S201, a working step S202 (fourth step) of opening portions A54*a* to 59*a* is performed. The orifice plate 15 having the opening portions A54*a* to 59*a* as illustrated in FIG. 7 is formed by the working step S202.

After the working step S202, a working step S203 (third step) of opening portions B54*b* to 59*b* is performed. The orifice plate 15 having the opening portions B54*b* to 59*b* as illustrated in FIG. 8 is formed by a working step S203.

After the working step S203, a working step S204 (first step) of the cylindrical portions 54*d* and 57*d* (the reference signs 55*d*, 56*d*, 58*d*, and 59*d* are not illustrated, and thus the reference signs 54*d* and 57*d* are used here) of the orifice is performed. As illustrated in FIG. 9, the orifice plate 15 having the cylindrical portions 54*d* and 57*d* (the reference signs 55*d*, 56*d*, 58*d*, and 59*d* are not illustrated, and thus the reference signs 54*d* and 57*d* are used here) of the orifice is formed by the working step S204.

A working step S205 of the opening portions C54*c* to 59*c* is performed after the working step S204. With the working step S205 (second step), as illustrated in FIG. 10, the orifice plate 15 having the opening portions C54*c* to 59*c* and the tapered portions 54*s* and 57*s* (the reference signs 55*s*, 56*s*, 58*s*, and 59*s* are not illustrated, and thus the reference signs 54*s* and 57*s* are used here) is formed. The configurations of the tapered portions 54*s* and 57*s* will be described in detail with reference to FIG. 20.

After Step S2, Step S3 of performing rough working of the seat surface 15*a* is performed. By the working step S3, the orifice plate 15 having the seat surface 15*a* subjected to rough working as illustrated in FIG. 11 is formed.

After Step S3, Step S4 of quenching the orifice plate 15 is performed.

After Step S4, Step S5 of finishing the seat surface 15*a* is performed. By the working step S5, the orifice plate 15 having the seat surface 15*a* subjected to finish processing as illustrated in FIG. 12 is formed.

Next, each working step of the orifice plate 15 will be described in detail with reference to FIGS. 13 to 17B.

The blank 15' illustrated in FIG. 5 is manufactured by machining or plastically working a disk-shaped member having a spherical portion 30 at the central portion of one end surface. Further, a bowl-shaped recess 29 is formed on an end surface of the blank 15' opposite to the spherical portion 30.

Next, press working of the injection portion (fuel injection portion) will be described.

In this step, the positioning holes 31*a*, 31*b*, and 31*c*, the opening portions A54*a* to 59*a*, the opening portions B54*b* to 59*b*, and the orifices 54 to 59 are continuously subjected to press working while chucking the blank 15'.

Figure 13:
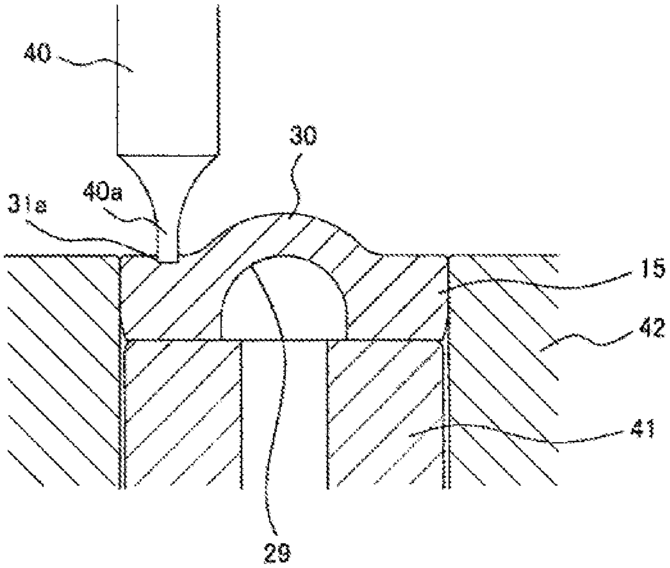
FIG. 13 is a cross-sectional view illustrating press working of the positioning hole according to the example of the present invention.

FIG. 13 is a cross-sectional view illustrating press working of the positioning hole according to the example of the present invention. As illustrated in FIG. 13, the blank 15' having the spherical portion 30 formed thereon is installed on the upper surface of the die 41, and the outer diameter is firmly held by the collet chuck 42. Further, the outer peripheral side of the spherical portion 30 is pressed by a cutting blade portion 40*a* of the punch 40 while holding the blank 15', and the positioning hole 31*a* is worked.

Similarly, the positioning holes 31*b* and 31*c* are worked. As described above, by forming the positioning holes 31*a*, 31*b*, and 31*c* in the blank 15' by press working, the orifice plate 15 having the positioning holes 31*a*, 31*b*, and 31*c* at three positions on the outer peripheral side of the spherical portion 30 as illustrated in FIG. 2 is obtained.

Figure 14:
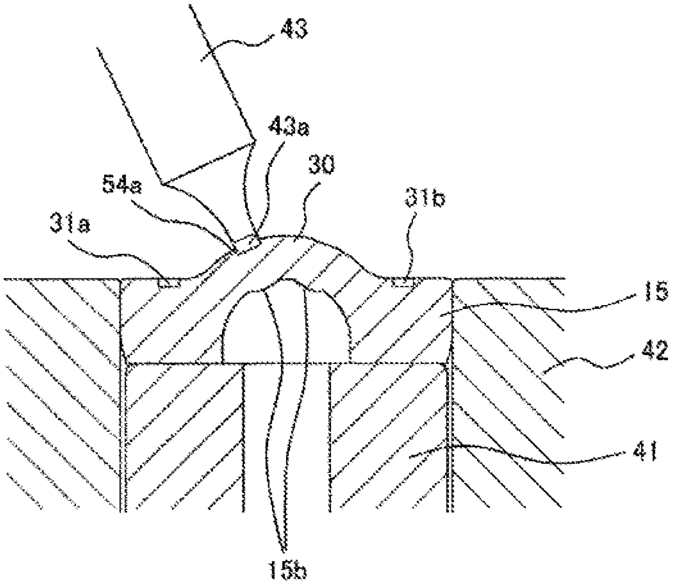
FIG. 14 is a cross-sectional view illustrating press working of the opening portion A according to the example of the present invention.

Then, press working illustrated in FIG. 14 is performed. FIG. 14 is a cross-sectional view illustrating press working of the opening portion A according to the example of the present invention.

In a state where the orifice plate 15 is held by the collet chuck 42, the spherical surface portion 30 is pressed by a cutting blade portion 43*a* of a punch 43, and the opening portion A54*a* is extruded into a bag hole shape. Similarly, the opening portions A55*a*, 56*a*, 57*a*, 58*a*, and 59*a* are worked. Note that the working of the opening portion A may mean press working and work-hardening of the surface. As described above, by forming the opening portion A in the orifice plate 15 by press working, the opening portion A having a surface roughness Rz of 0.2 μm or less having a surface substantially perpendicular to the center axis Bx of the opening portion A is formed in the spherical portion 30 as illustrated in FIG. 7.

Figure 15:
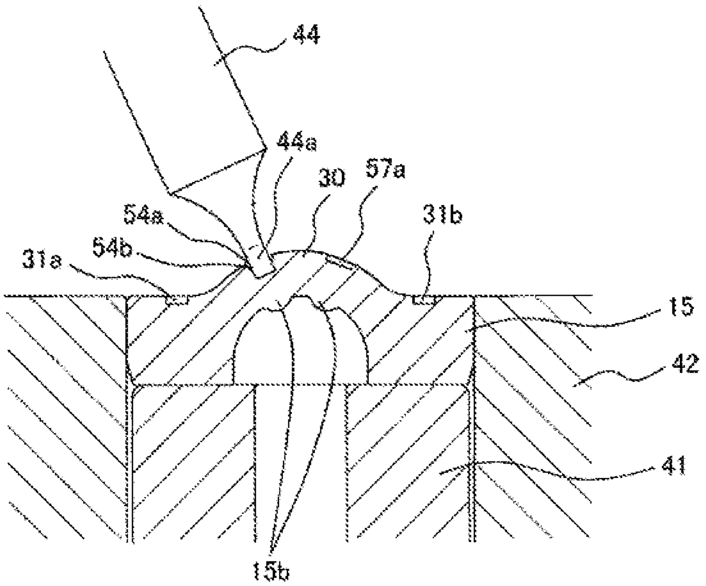
FIG. 15 is a cross-sectional view illustrating press working of the opening portion B according to the example of the present invention.
Figure 16:
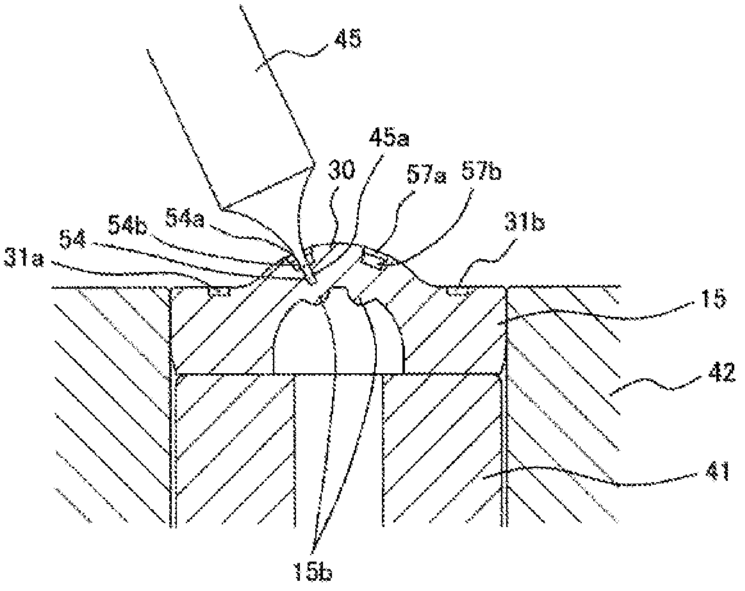
FIG. 16 is a cross-sectional view illustrating press working of the orifice according to the example of the present invention.

Then, press working illustrated in FIG. 15 is performed. FIG. 15 is a cross-sectional view illustrating press working of the opening portion B according to the example of the present invention.

While the orifice plate 15 is held by the collet chuck 42, the bottom surface of the opening portion A54*a* is pressed by a cutting blade portion 44*a* of a punch 44 from the same direction as the punch 43 forming the opening portion A, and the opening portion B54*b* is extruded into a bag hole shape. Similarly, the opening portions B55*b*, 56*b*, 57*b*, 58*b*, and 59*b* are worked, but the order of working is appropriately determined depending on the deflection direction of the orifice. Note that the processing of the opening portion B may mean press working and work-hardening of the surface. As described above, by forming the opening portion B in the orifice plate 15 by press working, the orifice plate 15 having the opening portion B having the surface roughness Rz of 0.2 μm or less on the bottom surface of the opening portion A as illustrated in FIG. 8 is obtained.

Then, press working illustrated in FIG. 16A is performed. FIG. 16A is a cross-sectional view illustrating press working of the orifice according to the example of the present invention.

In a state where the orifice plate 15 is held by the collet chuck 42, a cutting blade portion 45*a* of a punch 45 is pressed perpendicularly to the bottom surface portion of the opening portion B54*b*, and the orifice 54 is extruded into a bag hole shape. Similarly, the orifices 55, 56, 57, 58, and 59 are worked, but the order of working is appropriately determined depending on the deflection direction of the orifices. As described above, by forming the orifice in the orifice plate 15 by press working, the orifice plate 15 having the orifice on the bottom surface of the opening portion B as illustrated in FIG. 9 is obtained. Since the orifice plate 15 is held by the collet chuck 42, the orifice plate is worked with high positional accuracy so that the opening portion A, the opening portion B, and the center axes Ax and Bx of the orifices are substantially aligned with reference to the positioning holes 31*a*, 31*b*, and 31*c*. In addition, the orifice can have an inner surface processed into an entire molding surface by being press-worked into a bag hole shape, and can have a surface roughness Rz of 0.2 μm or less without a fracture surface or the like.

Figure 17A:
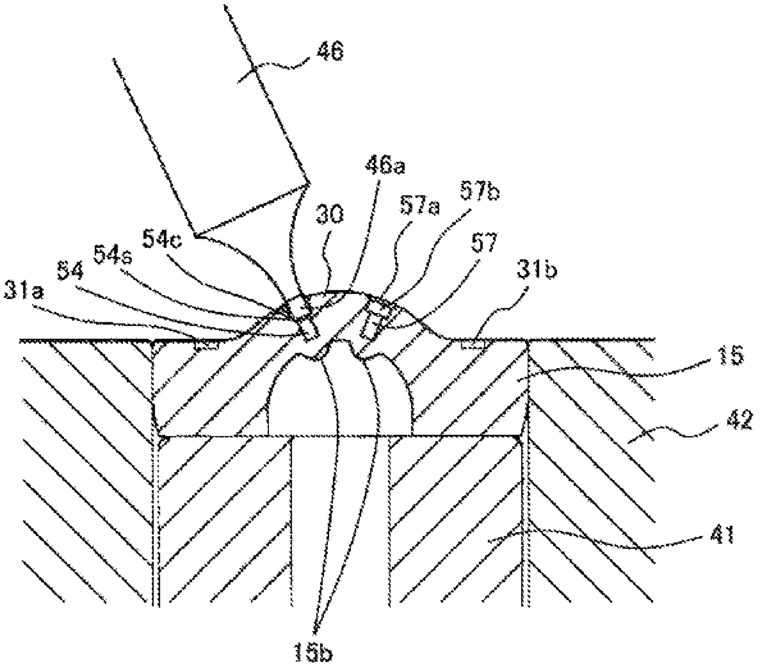
FIG. 17A is a cross-sectional view illustrating press working of the opening portion C and the tapered portion according to the example of the present invention.
Figure 17B:
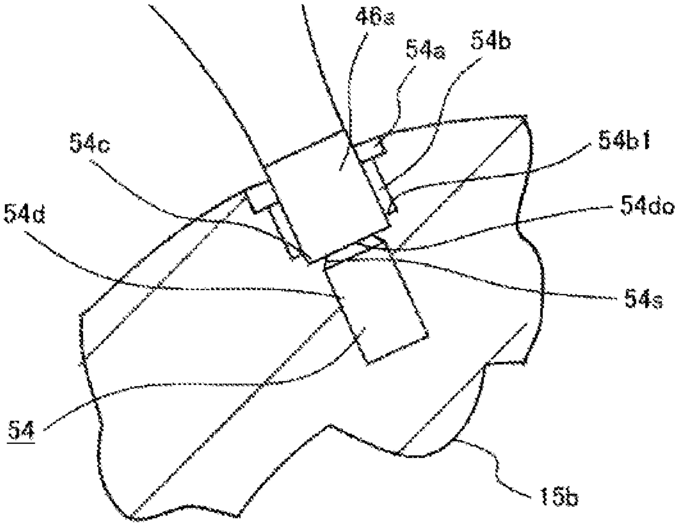
FIG. 17B is an enlarged cross-sectional view illustrating a vicinity of the opening portion C and the tapered portion in the press working of FIG. 17A.

Then, press working illustrated in FIGS. 17A and 17B is performed. FIG. 17A is a cross-sectional view illustrating press working of the opening portion C and the tapered portion according to the example of the present invention. FIG. 17B is an enlarged cross-sectional view illustrating the vicinity of the opening portion C and the tapered portion in the press working of FIG. 17A.

In a state where the orifice plate 15 is held by the collet chuck 42, a cutting blade portion 46*a* of a punch 46 is pressed at a right angle to the bottom surface portion 54*b*1 of the opening portion B54*b* to mold the opening portion C54*c*, and the material is caused to flow to the radial center side of the orifice 54 in the vicinity of the downstream opening portion 54*do* of the orifice 54 to mold the tapered portion 54*s*. At this time, the orifice 54 includes an orifice cylindrical portion 54*d* and a tapered portion 54*s*. Similarly, the opening portions C55*c*, 56*c*, 57*c*, 58*c*, and 59*c* and the tapered portions 55*s*, 56*s*, 57*s*, 58*s*, and 59*s* are worked, but the order of working is appropriately determined depending on the deflection direction of the orifice. As described above, by forming the tapered portion on the orifice plate 15 by press working, the orifice plate 15 having the opening portion C and the tapered portion on the bottom surface of the opening portion B as illustrated in FIG. 10 is obtained.

Since the tapered portion has a tapered shape in which the cross-sectional area decreases from the upstream side to the downstream side, the tapered portion can also be referred to as a tapered portion or a cross-sectional area reduction portion. Note that the cross-sectional area in this case is an area of a cross section perpendicular to the center axis Ax. In addition, since the tapered portion constitutes a portion having the smallest cross-sectional area in the injection portion, the tapered portion may be referred to as a tapered throttle portion.

Here, features of the orifice at the time of press working will be described with reference to FIGS. 18A and 18B.

Figure 18A:
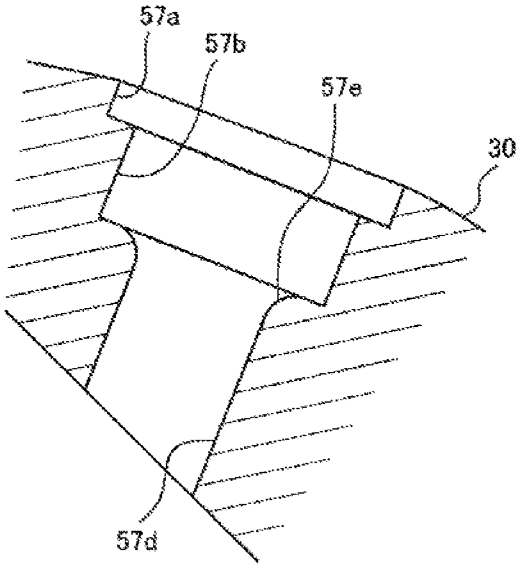
FIG. 18A is an enlarged cross-sectional view illustrating a state after an orifice 57 is worked, in order to describe an object in the press working of the orifice.

FIG. 18A is an enlarged cross-sectional view illustrating a state after the orifice 57 is worked, in order to describe the object in the press working of the orifice. Although the orifice 57 is described as an example in FIG. 18A, the same applies to other orifices.

When the surface is not work-cured at the time of press working of the opening portion B, or when the degree of work curing is small, shear droop 57e is generated at an opening edge portion formed on the inlet side of the punch 45 at the time of press working of the orifice. When the shear droop 57e remains in the completed orifice plate 15, the fuel flowing down through the orifice starts to spread from the portion of the shear droop 57e, and the spreading angle of the spray injected from the orifice increases.

In the present example, since the opening portion C having a diameter larger than the orifice diameter is press-worked after the press working of the orifice, the shear droop 57e is shaped by the pressing of the opening portion C and disappears. Therefore, the fuel injection valve 1 of the present example can inject a spray having a small spreading angle.

Figure 18B:
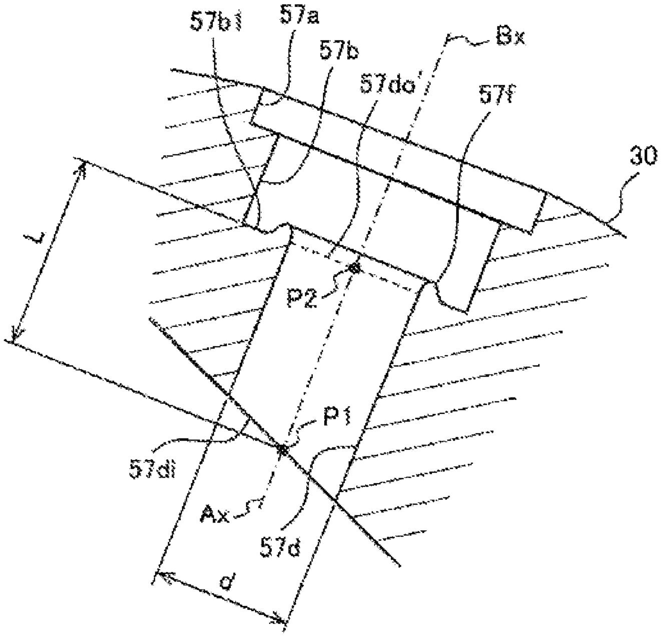
FIG. 18B is an enlarged cross-sectional view illustrating the state after the orifice 57 is worked, in order to describe the object in the press working of the orifice.

FIG. 18B is an enlarged cross-sectional view illustrating a state after the orifice 57 is worked, in order to describe the object in the press working of the orifice. Although the orifice 57 is described as an example in FIG. 18B, the same applies to other orifices.

When the plate thickness L and the punch diameter d for press working have a relation of L/d 1.5, a convex portion 57f is generated at an opening edge portion formed on the inlet side of the punch 45 during press working. In the present example, the plate thickness L is the length of the orifice 57, and the punch diameter d is the inner diameter of the orifice 57. The convex portion 57f is formed so as to rise from the bottom surface 57b1 of the opening portion B57b. Since the inlet opening surface (upstream opening surface) 57di of the cylindrical portion 57d' of the orifice 57 is not orthogonal to the center axis Ax of the orifice 57, the length L of the orifice 57 is defined as follows.

L: length formed between an intersection P1 between the center axis Ax and the inlet opening surface 57di of the cylindrical portion 57d' and an intersection P2 between the center axis Ax and the outlet opening surface 57do' of the cylindrical portion 57d', on the center axis Ax of the orifice 57

In this case, the cylindrical portion 57d' is a cylindrical portion when the orifice 57 is extruded into a bag hole shape by the punch 45, and the orifice 57 is in a state before the opening portion C57c and the tapered portion 57s are formed. In this case, the outlet opening surface 57do' of the cylindrical portion 57d' is flush with the bottom surface 57b1 of the opening portion B57b. Therefore, the definition of the length L may be the bottom surface 57b1 instead of the outlet opening surface 57do'.

In the example described above, the diameter of the cutting blade portion 46a of the punch 46 forming the opening portion C57c and the tapered portion 57s is smaller than the diameter of the cutting blade portion 44a of the punch 44 forming the opening portion B57b. This is because the tapered portion 57s can be formed even when the bottom surface 57b1 of the opening portion B57b is a flat surface. As described with reference to FIG. 18B, when the convex portion 57f is formed on the bottom surface 57b1 of the opening portion B57b, the tapered portion 57s can be formed by plastically flowing the material of the convex portion 57f toward the radial center side of the orifice 57. In this case, the tapered portion 57s can be formed using the cutting blade portion 44a of the punch 44 forming the opening portion B57b. In this case, the opening portion C57c is not formed.

Even when the convex portion 57f is formed on the bottom surface 57b1 of the opening portion B57b, the tapered portion 57s may be formed by forming the opening portion C57c with the cutting blade portion 46a of the punch 46 having a diameter smaller than the diameter of the cutting blade portion 44a of the punch 44 for forming the opening portion B57b. In this case, the amount of the material to be plastically flowed can be increased, and the large tapered portion 57s can be formed.

Figure 19:
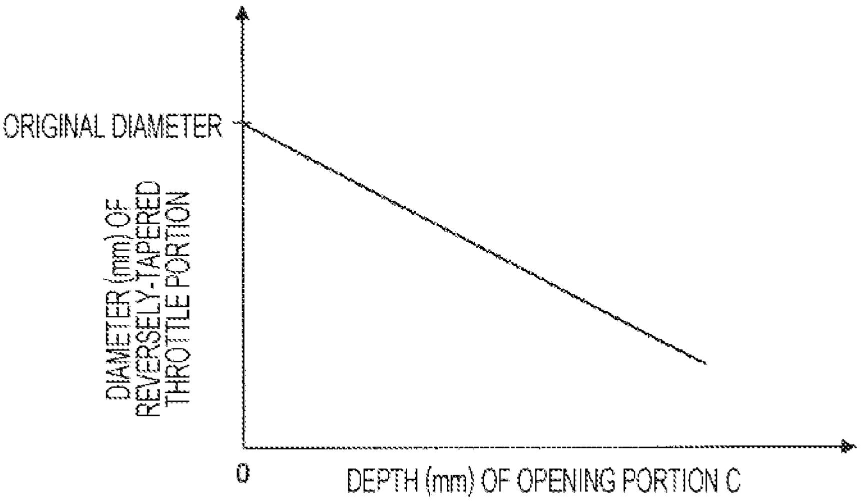
FIG. 19 is a graph showing a relation between a depth of the opening portion C and a diameter of the tapered portion according to the example of the present invention.

FIG. 19 is a graph showing a relation between the depth of the opening portion C and the diameter of the tapered portion according to the example of the present invention.

As illustrated in FIG. 19, the depth of the opening portion C and the diameter of the tapered portion are substantially linearly correlated, and the diameter of the tapered portion decreases as the depth of the opening portion C increases.

Since the orifice plate 15 is held by the collet chuck 42, the orifice plate is worked with high positional accuracy so that the center axes Ax and Bx of the opening portion A, the opening portion B, the opening portion C, the orifice, and the reverse tapered throttle portion are substantially straight with reference to the positioning hole.

Here, since the material is extruded forward as in 15b (see FIGS. 14 and 15) when the opening portion A and the opening portion B are press-worked, the plate thickness of the orifice processing portion can be made thicker than that in the blank, and occurrence of a fracture surface can be suppressed.

In addition, since the plate thickness of the blank can be reduced, the working stress at the time of orifice processing can be reduced, the orifice accuracy can be improved, and the punch life can be improved.

Furthermore, since the orifice processing portion partially swells by extruding the opening portion A and the opening portion B (15b), the flow of the material to the adjacent orifice is alleviated when the orifice is processed, and the previously processed orifice is hardly deformed and can be processed with high accuracy. In addition, since each orifice is processed into a bag hole shape, rigidity is high, and when adjacent orifices are press-worked, the already processed orifice is hardly deformed, and processing can be performed with high accuracy. When punching is performed, the rigidity of the orifice is reduced, so that the orifice is easily deformed when the adjacent hole is punched.

After the press working illustrated in FIGS. 17A and 17B, the cabin 15d and the substantially conical seat surface 15a (valve seat) illustrated in FIG. 11 are processed. The working at this time is rough working. The extruded portion 15b formed in the recess on the opposite end surface of the spherical portion 30 by molding the orifice into a bag hole shape is removed by working the cabin 15d and the seat surface 15a (valve seat), and six orifices 54 to 59 simultaneously penetrate to the seat surface 15a side. The working method at this time is machining, electrical discharge working, or the like. As a result, the orifice can be formed on the entire molding surface by press working.

Then, in order to improve the wear resistance of the seat surface 15*a* that becomes the collision surface of the movable valve 5, the orifice plate 15 is subjected to vacuum quenching treatment, and for example, in the case of a material of martensitic stainless steel SUS 420J2, the hardness is set to HRC52 to 56. At this time, the orifice plate 15 is recrystallized by martensitic transformation, and the surface roughness of the opening portion A, the opening portion B, and the orifice inner surface is Rz of 2 μm or less.

Then, as illustrated in FIG. 12, the seat surface 15*a* after quenching is finished by being polished to improve roundness and surface roughness, and improve oil tightness between the valve seat portion 11*a* and the seat surface.

Finally, burrs generated on the upstream side of the orifice are removed by seat surface finishing, and the orifice plate is completed. Although various deburring methods are conceivable at this time, deburring at a time with a water jet or the like is preferable in terms of working cost because there are a plurality of orifices.

By manufacturing in the above steps, it is possible to manufacture a plurality of orifices and opening portions each having a cylindrical portion and a tapered portion having different deflection angles in a state where the surface roughness Rz is 2 μm or less, and variations in shape, accuracy, and surface roughness are small. In the working step of the present example, the orifice can be manufactured easily and inexpensively with high productivity.

Therefore, it is possible to further reduce adhesion of deposits such as carbon generated by combustion of fuel at the time of cylinder injection to the opening portion A, the opening portion B, the opening portion C, the orifice, and the tip end portion of the fuel injection valve positioned in the engine cylinder, and it is possible to provide a fuel injection valve having good durability capable of maintaining the performance in the initial state. In addition, it is possible to reduce the number of particles of particulate matter and exhaust fine particles in the exhaust gas.

In addition, since the method of press working the orifice having the tapered portion according to the present example can significantly suppress the capital investment as compared with the method of working the orifice by laser working, the fuel injection valve can be provided at a lower cost.

In the above-described example, the region where the opening portion A is formed has been described as the spherical surface portion 30, but a curved surface (curved surface portion) other than the spherical surface may be used. In addition, the opening portion A may be eliminated, and only the opening portion B and the opening portion C may have a two-step shape.

Figure 20:
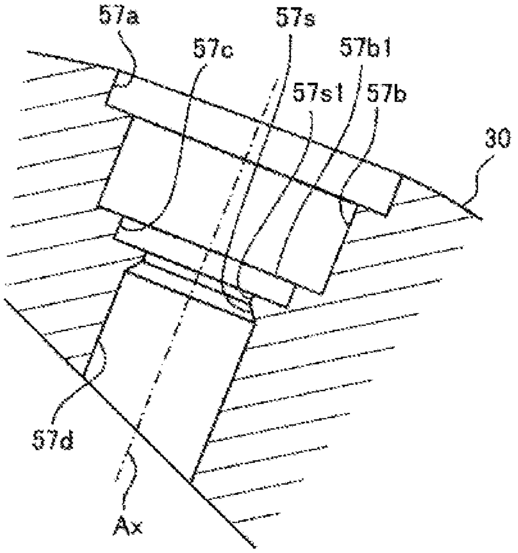
FIG. 20 is a view illustrating the tapered portion of the orifice in detail.

FIG. 20 is a view illustrating the tapered portion of the orifice in detail. Although the orifice 57 is described in FIG. 20, the other orifices 54-56, 58, and 59 have the same configuration.

As illustrated in FIG. 20, a communication hole 57*s*1 having a substantially uniform inner diameter in the direction along the center axis Ax of the cylindrical portion (orifice hole) 57*d* of the orifice is formed at the downstream end portion of the tapered portion (cross-sectional area reduction portion) 57*s*. That is, the communication hole 57*s*1 is connected to the downstream end of the tapered portion 57*s*, and the inner diameter of the communication hole 57*s*1 is the same as the minimum inner diameter of the cross-sectional area reduction portion 57*s*. As illustrated in FIG. 1, in the orifice 54, a communication hole 54*s*1 is formed between the opening portion C (first recess portion) 54*c* and the tapered portion (cross-sectional area reduction portion) 54*s*.

Further, the communication holes 54*s*1 and 57*s*1 are formed along with the formation of the opening portions C (first recess portions) 54*c* and 57*c* and the tapered portions (cross-sectional area reduction portions) 54*s* and 57*s* in the working step S205 (second step). That is, the flow of the material forms the communication holes 54*s*1 and 57*s*1. The communication holes 54*s*1 and 57*s*1 constitute a part of the tapered portions (cross-sectional area reduction portions) 54*s* and 57*s*. Even if the communication holes 54*s*1 and 57*s*1 exist, the cross-sectional areas of the tapered portions (cross-sectional area reduction portions) 54*s* and 57*s* do not increase from the upstream side toward the downstream side. That is, the tapered portions (cross-sectional area reduction portions) 54*s* and 57*s* have communication holes (second inner circumferential surfaces) 54*s*1 and 57*s*1 having substantially uniform inner diameters in the direction along the center axis of the orifice hole at the downstream end portions.

In the tapered portions (cross-sectional area reduction portions) 54*s* and 57*s* in the present example, since an extreme acute angle portion is not formed, it is not particularly necessary to chamfer the corner portions.

Features of the above-described example will be listed below.

(1) A working method of an orifice includes a first step S204 of forming orifice holes 54*d* to 59*d* in an orifice forming member 15, a second step S205 of pressing a downstream end surface of the orifice forming member 15 in which the orifice holes 54*d* to 59*d* open, in a direction toward an upstream side of the holes 54*d* to 59*d* by a punch 46 having a cutting blade portion 46*a* larger than cross sections of the orifice holes 54*d* to 59*d*. The second step S205 causes a material of the orifice forming member 15 to flow from an entire circumference at a downstream end portion of the orifice holes 54*d* to 59*d* to an inside of each of the orifice holes 54*d* to 59*d* to form cross-sectional area reduction portions 54*s* and 57*s* (the reference signs 55*s*, 56*s*, 58*s*, and 59*s* are not illustrated, and thus the reference signs 54*s* and 57*s* are used here. This is similarly applied to the following description) in which cross-sectional areas of the orifice holes 54*d* to 59*d* are reduced from an upstream side to a downstream side.

(2) In (1), the orifice holes 54*d* to 59*d* have a circular cross section.

(3) In (2), in the second step S205, first recess portions 54*c* to 59*c* are formed in the downstream opening portions of the orifice holes 54*d* to 59*d* together with the cross-sectional area reduction portions 54*s* and 57*s*, the first recess portions having an inner diameter larger than that of the orifice holes 54*d* to 59*d*.

(4) In (3), communication holes 54*s*1 and 57*s*1 (the reference signs 55*s*1, 56*s*1, 58*s*1, and 59*s*1 are not illustrated, and thus the reference sign 57*s*1 is used here. This is similarly applied to the following description) having an inner diameter which is substantially uniform in the direction along the center axis Ax of the orifice holes 54*d* to 59*d* are formed between the first recess portions 54*c* to 59*c* and the cross-sectional area reduction portions 54*s* and 57*s*, and the inner diameter of the communication hole 57*s*1 is equal to the minimum inner diameter of the cross-sectional area reduction portions 54*s* and 57*s*.

(5) In (4), the communication hole **57*s*1 is formed with the formation of the first recess portions 54*c* to 59*c* and the cross-sectional area reduction portions 54*s* and 57*s* in the second step S205**.

(6) In (3), the working method further includes a third step S203 of forming second recess portions **54*b* to 59*b* having bottom surfaces in which outlet opening portions of the orifice holes 54*d* to 59*d* open, before the orifice holes 54*d* to 59*d* are formed, and the inner diameters of the second recess portions 54*b* to 59*b* are formed to be larger than those of the orifice holes 54*d* to 59*d*.**

(7) In (6), the working method further includes a fourth step S202 of forming the third recess portions **54*a* to 59*a* having a bottom surface in which the second recess portions 54*b* to 59*b* open, before the second recess portions 54*b* to 59*b* are formed, and the inner diameters of the third recess portions 54*a* to 59*a* are larger than the inner diameters of the second recess portions 54*b* to 59*b*.**

(8) In (3), the second recess portions **54*b* to 59*b* are press-molded in the spherical portion 30 provided at the tip end of the orifice forming member 15, in the first step S204, the orifice holes 54*d* to 59*d* are press-worked into a cylindrical shape on the bottom surfaces of a work-hardened second recess portions 54*b* to 59*b*, and, in the second step S205, the bottom surfaces of the second recess portions 54*b* to 59*b* in which the orifice holes 54*d* to 59*d* open are press-worked to form the cross-sectional area reduction portions 54*s* and 57*s*.**

(9) In (8), when the inner diameter of the orifice hole is defined as d, and a length formed between the intersection P1 between the center axis Ax and the inlet opening surface **57*di* (the reference signs 54*di*, 55*di*, 56*di*, 58*di*, and 59*di* are not illustrated, and thus the reference sign 57*di* is used here. This is similarly applied to the following description) of the orifice holes 54*d* to 59*d* before the cross-sectional area reduction portions 54*s* and 57*s* are formed, and the intersection P2 between the center axis Ax and the outlet opening surface 57*do*' (the reference signs 54*do*', 55*do*', 56*do*', 58*do*', and 59*do*' are not illustrated, and thus the reference sign 57*do*' is used here. This is similarly applied to the following description) of the orifice holes 54*d* to 59*d*, on the center axis Ax of the orifice holes 54*d* to 59*d*, is set to L, the orifice holes 54*d* to 59*d*** are formed to satisfy a relation of $L/d \geq 1.5$.

(10) In (9), in the first step S204, a convex portion **57*f* (the reference signs 54*f*, 55*f*, 56*f*, 58*f*, and 59*f* are not illustrated, and thus the reference sign 57*f* is used here. This is similarly applied to the following description) that swells from bottom surfaces of the second recess portions 54*b* to 59*b* on the bottom surfaces of the second recess portions 54*b* to 59*b* in a vicinity of outlet opening portions of the orifice holes 54*d* to 59*d* with press-working of the orifice holes 54*d* to 59*d*, and, in the second step S205, the cross-sectional area reduction portions 54*s* and 57*s* are formed by press-working the convex portion 57*f*** into a substantially flat shape.

(11) A fuel injection valve 1 includes an orifice forming member 15 in which orifice holes **54*d* to 59*d* are formed. The orifice forming member 15 includes cross-sectional area reduction portions 54*s* and 57*s* having a cross-sectional area that is reduced from a first inner circumferential surface on an upstream side of the orifice holes 54*d* to 59*d* toward a downstream side, first recess portions 54*c* to 59*c* that are formed on a downstream side of the cross-sectional area reduction portions 54*s* and 57*s* and have an inner diameter larger than a minimum inner diameter of the cross-sectional area reduction portions 54*s* and 57*s*, and second recess portions 54*b* to 59*b* that are formed on a downstream side of the first recess portions 54*c* to 59*c* and have an inner diameter larger than the inner diameter of the first recess portions 54*c* to 59*c*.**

(12) In (11), the first inner circumferential surface is formed to be a cylindrical surface.

(13) In (12), the cross-sectional area reduction portions **54*s* and 57*s* have a second inner circumferential surface 57S1 at the downstream end portion, the second inner circumferential surface 57S1 having a substantially uniform inner diameter in the direction along the center axis Ax of the orifice holes 54*d* to 59*d*.**

Note that, the present invention is not limited to the above example, and various modifications may be provided.

For example, the above example has been described in detail in order to explain the present invention in an easy-to-understand manner, and the above example is not necessarily limited to a case including all the configurations. Regarding some components in the example, other components can be added and replaced.

REFERENCE SIGNS LIST

15 orifice forming member
46 punch
**46*a*** cutting blade portion
**54*b* to 59*b*** second recess portion
**54*c* to 59*c*** first recess portion
**54*d* to 59*d*** orifice hole
**54*s*, 57*s*** cross-sectional area reduction portion
**57*di* inlet opening surface of orifice hole 57*d* before cross-sectional area reduction portion 57*s*** is formed
**57*f*** convex portion
**57*s*1** communication hole
Ax center axes of orifice holes **54*d* to 59*d***
S202 fourth step
S203 third step
S204 first step
S205 second step

The invention claimed is:

1. A working method of an orifice, the working method comprising:

a first step of pressing a punch against a bottom surface of a second recess portion of an orifice forming member to form an orifice hole smaller than an inner diameter of the second recess portion by press working; and;

a second step of pressing a downstream end surface of the orifice forming member in which the orifice hole opens, in a direction toward an upstream side of the orifice hole by a punch having a cutting blade portion larger than a cross section of the orifice hole, wherein in the first step, a convex portion swells from a bottom surface of the second recess portion on a bottom surface of the second recess portion in a vicinity of an outlet opening portion of the orifice hole with press-working of the orifice hole, and in the second step, the convex portion is pressed substantially flat, and a material of the orifice forming member is caused to flow from an entire circumference at a downstream end portion of the orifice hole to an inside of the orifice hole, whereby the first recess portion having an inner diameter larger than that of the orifice hole is formed on the bottom surface of the second recessed portion, and a cross-sectional area reducing portion in which a cross-sectional area of the orifice hole is reduced from an upstream side to a downstream side is formed in the downstream opening portion of the orifice hole.

2. The working method of an orifice according to claim 1, wherein the orifice hole has a circular cross section.

3. The working method of an orifice according to claim 2, wherein, in the second step, a first recess portion is formed in a downstream opening portion of the orifice hole together with the cross-sectional area reduction portion, the first recess portion having an inner diameter larger than an inner diameter of the orifice hole.

4. The working method of an orifice according to claim 3, wherein a communication hole is formed between the first recess portion and the cross-sectional area reduction portion, the communication hole having an inner diameter which is substantially uniform in a direction along a center axis of the orifice hole, and the inner diameter of the communication hole is equal to a minimum inner diameter of the cross-sectional area reduction portion.

5. The working method of an orifice according to claim 4, wherein the communication hole is formed with formation of the first recess portion and the cross-sectional area reduction portion in the second step.

6. The working method of an orifice according to claim 3, the working method further comprising a third step of forming a second recess portion having a bottom surface in which an outlet opening portion of the orifice hole opens, before the orifice hole is formed, wherein an inner diameter of the second recess portion is larger than the inner diameter of the orifice hole.

7. The working method of an orifice according to claim 6, the working method further comprising a fourth step of forming a third recess portion having a bottom surface in which the second recess portion opens, before the second recess portion is formed, wherein an inner diameter of the third recess portion is larger than the inner diameter of the second recess portion.

8. The working method of an orifice according to claim 3, wherein a second recess portion is press-formed in a spherical portion provided at a tip end of the orifice forming member, in the first step, the orifice hole is press-worked into a cylindrical shape on a bottom surface of a work-hardened second recess portion, and in the second step, the bottom surface of the second recess portion in which the orifice hole opens is press-worked to form the cross-sectional area reduction portion.

9. The working method of an orifice according to claim 8, wherein when the inner diameter of the orifice hole is set as d, and a length formed between an intersection between a center axis and an inlet opening surface of the orifice hole before the cross-sectional area reduction portion is formed and an intersection between the center axis and an outlet opening surface of the orifice hole, on the center axis of the orifice hole, is set as L, the orifice hole is formed to satisfy a relation of $L/d \geq 1.5$.

10. The working method of an orifice according to claim 9, wherein in the second step, the cross-sectional area reduction portion is formed by press-working the convex portion into a substantially flat shape.

* * * * *